H. A. STUKES

FUEL FEEDING DEVICE

June 28, 1932.

Re. 18,508

Original Filed March 20, 1928 2 Sheets-Sheet 1

Inventor

Horace A. Stukes

By

Hardway & Cathey

Attorneys

H. A. STUKES

June 28, 1932. FUEL FEEDING DEVICE Re. 18,508

Original Filed March 20, 1928 2 Sheets-Sheet 2

Inventor
Horace A. Stukes

By Hardway & Cathey
Attorneys

Reissued June 28, 1932 Re. 18,508

UNITED STATES PATENT OFFICE

HORACE A. STUKES, OF SAN ANTONIO, TEXAS, ASSIGNOR TO E. V. HARDWAY, OF HARRIS COUNTY, TEXAS, AS TRUSTEE FOR H. M. DUNCAN, RAYMOND PEARSON, AND BEN H. JOHNSTON

FUEL FEEDING DEVICE

Original No. 1,720,931, dated July 16, 1929, Serial No. 263,166, filed March 20, 1928. Application for reissue filed May 22, 1931. Serial No. 540,035.

This invention relates to a fuel-feeding device.

One object of the invention is to provide a device of the character described embodying certain improvements in that character of fuel feeding devices specially designed for use in connection with internal combustion motors, and whereby the fuel is lifted, by air pressure induced by a partial vacuum in the device, from a supply tank, of a lower level, to the device and fed by gravity to the carbureter of the motor.

Another object of the invention resides in the provision of a fuel feeding device embodying a main feed tank and associated with it an auxiliary vacuum tank, with a novel valve and a novel type of controlling mechanism therefor, through which the air pressure in the auxiliary tank may be controlled to regulate the supply of fuel to the device.

A further feature of the invention resides in novel means for straining the liquid fuel to relieve it of foreign matter as well as novel means for trapping foreign matter which has a tendency to settle so that the same may be excluded from the fluid passageway to the carbureter.

A still further feature of the invention resides in the provision of a fuel feeding device which is mounted in a novel manner, to the end that it may be securely yet quickly and easily mounted, and as readily demounted; and whose parts are assembled in a novel manner and with few connecting parts so that the device may be quickly taken apart or assembled.

It is also one of the objects of the invention, to provide a visible indicator through which the level of the fuel in the main feed tank of the device, may be readily ascertained.

With the above and other objects in view this invention has particular relation to certain novel features of construction, operation and arrangement of parts an example of which is given in this specification and illustrated in the accompanying drawings, wherein:—

Figure 4:
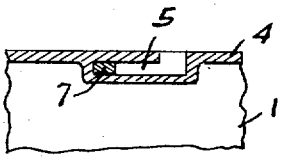
Figure 4 shows a fragmentary vertical sectional view taken on the line 4—4 of Figure 3.
Figure 3:
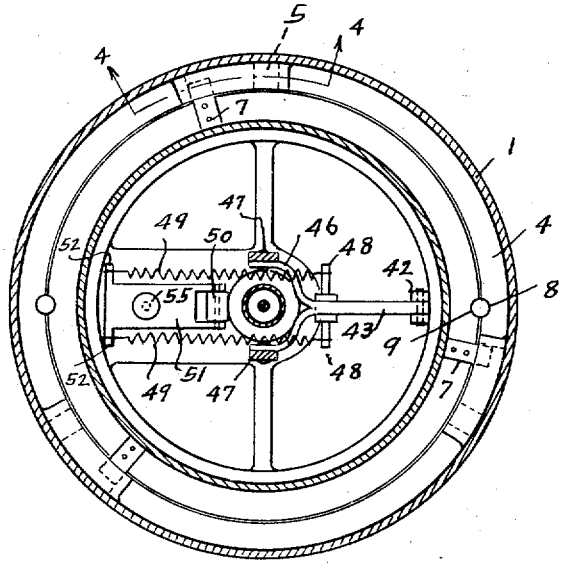
Figure 3 shows a horizontal sectional view taken on the line 3—3 of Figure 1.
Figure 5:
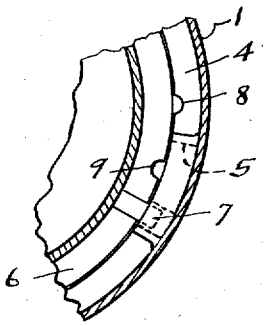
Figure 5 shows a fragmentary horizontal sectional view showing the main feed tank and the auxiliary vacuum tank in position, as being assembled together.

Referring now more particularly to the drawings, wherein like numerals of reference designate similar parts in each of the figures the numeral 1 designates a feed tank and the numeral 2 designates a vacuum tank which is assembled with and spaced from the feed tank forming a fuel feed chamber 3. The upper end of the tank 1 has an annular inwardly extending rim 4, which has a plurality of correspondingly turned J-slots 5, and the upper end of the vacuum tank 2 has an outwardly extending annular rim 6 provided with the projecting tenons 7 adapted to engage in said J-slots, as shown in Figures 3, 4 and 5. The rims 4 and 6 have the marginal notches 8 and 9 which register, when the tanks 1 and 2 are relatively turned, to engage the tenons 7 in the slots 5, and keyways are thus formed. There is a cover 10 for said tanks and the keys 11 are inserted through the margin of said cover and into said keyways to lock said tanks against relative rotation and to thus prevent the release of the tenons 7 from the slots 5.

There is a tube 12 anchored to, and whose lower end may extend beneath, the bottom of the tank 2 and this end may extend up through the axial bore 13 through the cover 10 and on up through the bearing 14 in the free end of the laterally extending arm 15 of the bracket 16 and threaded onto the upper end of the tube 12 there is a clamp nut 17 which clamps said arm securely between said nut and the cover 10 and thus securely anchors the fuel feeding device to the supporting bracket 16 and also holds the cover in assembled relation with said tanks. The bracket 16 may be secured to the dash board 18 of a motor vehicle in connection with which the device is used, or to any other suitable support. The tank 1 carries a clamp 19, on one side, and the bracket 16 carries an arm 20 whose free end terminates in a spherical head 21 adapted to be inserted endwise into said clamp, thus forming a connection through which the device may be further anchored to said bracket 16.

The bore 13 is somewhat larger, in diameter, than the diameter of the tube 12 and is extended up into the arm 15 and said arm has a longitudinally extended channel 22 which is connected, at one end, into the upper end of the bore 13 and the arm 15 has a tapped hole 23 adapted to receive the end of a pipe (not shown) through which the motive fuel may be derived from a supply tank into said channel 22 and thence through the bore 13 into the vacuum tank 2.

Leading downwardly from the vacuum tank 2 there is a discharge spout 24 having an outlet flap valve 25 through which the liquid fuel is delivered from the vacuum tank 2 into the chamber 3.

The bottom of the tank 1 has a drain port 26 for cleansing purposes and normally closed by a suitable plug. The bottom of the tank 1 also has an upstanding nipple 27 which has a channel 28 therethrough and the lower end of this nipple is adapted to be connected to the feed pipe leading to the carbureter. The nipple 27 stands up in the chamber 3 and its inlet end is enclosed by a cupshaped foraminated strainer 29 which is anchored to said nipple and whose upper end is closed by the float 30 fitted loosely therein.

Upstanding from the float 30 is a gauge rod 31 which may extend up through the tube 12 and nut 17 and whose upper end is visible and thus serves to indicate the level of the fluid in the chamber 3.

In the vacuum tank 2 and vertically movable on the tube 12 as a guide there is a float 32 formed hollow and of light material so as to be buoyant. The vacuum tank is connected to any source of suction such as the intake manifold of the motor through the usual suction passageway 33, of the cover 10, and the inner end of the passageway is formed into an enlarged flared valve seat 34 with which the correspondingly shaped valve 35 cooperates to open and close the passageway 33. The vacuum tank is also connected with the outer air through a passageway 36 in the cover 10 and whose inner end is formed with a tapered valve seat 37 with which the valve 38 cooperates. The valves 35, 38 are connected by the stem 39 which works through a bearing 40 between said valve seats. There is an air duct axially through the valve 35 whose upper end is turned laterally through the stem 39 and whose lower end communicates with the interior of the tank 2. When the float 32 rises to a predetermined height the valves are lifted and the valve 35 seats in the seat 34 and closes the suction passageway 33 and the upper end of the duct 41 is carried above the seat 37 and the interior of the tank 2 is thus connected with the outer air to permit the fluid to drain by gravity from the tank 2, through the valve 29, into the chamber 3.

At one side of the vacuum tank there depends from the cover 10 an anchor bar 42 and pivoted to this bar are the inwardly converging upper and lower arms 43, 44 whose free ends are connected by the side links 45, and the arm 44 is extended and formed into a yoke 46 the free ends of whose arms are pivotally connected to the respective upstanding lugs 47, 47 carried by the float 32. Located midway between the ends of the links 45 are the outwardly extending anchor pins 48, 48 forming anchors to which the pull springs 49, 49 are connected, at one end. On the opposite side of the tube 12 from the links 45 there is an anchor 50 depending from the cover plate 10 and a valve actuating lever 51 has its inner end connected thereto. The other end of this lever has the lateral studs 52, 52 to which the other ends of the corresponding springs 49 are attached. The valve 35 has a depending stem 53, which works loosely through a bearing 54 in the lever 51 and its lower end has an enlarged head 55 to prevent its detachment from said lever. This valve assembly is connected to said lever 51 at a point inwardly from the free end of said lever, that is at a point between the lever fulcrum and the lateral studs 52 so as to give a maximum amount of leverage to operate the valve assembly. This arrangement also is effective to permit the pull springs 49 to act with equal efficiency on the valve assembly when it is in either of its two positions.

Figure 6:
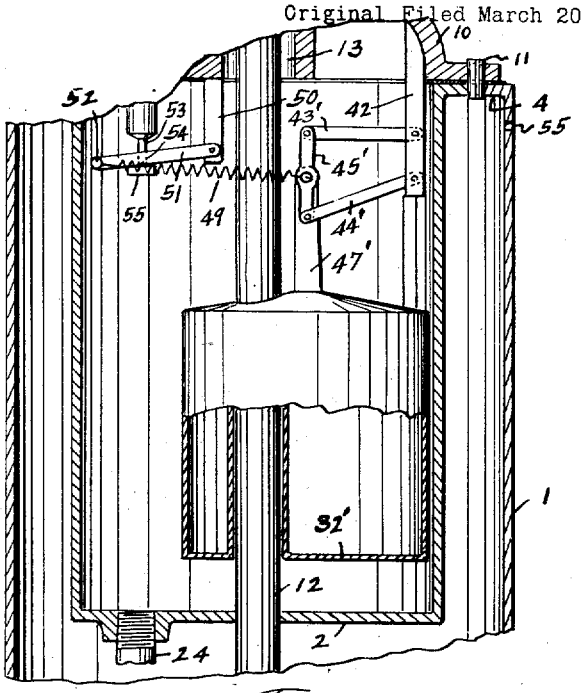
Figure 6 shows a fragmentary vertical sectional view of a modified form of the device.

In the form shown in Figure 6 the float 32′ is eccentric with respect to the tank 2 and has a vertical bearing on the tube 12. This float 32′ has a single central upstanding lug 47′ to the upper end of which the link 45′ is pivoted. The arms 43′, 44′ are pivoted at their outer ends to the bar 42 and they diverge and their other ends are pivoted to the respective upper and lower ends of the link 45′. This link has the oppositely extended pins 48, 48, forming anchors to which the adjacent ends of the springs 49 are attached.

In operation when the supply of fuel in the vacuum tank is low the float 32, or 32′, therein will descend opening the valve 35 and seating the valve 38 to close the duct 41. The suction induced by the motor will then create a partial vacuum in the tank 2 and the atmospheric pressure on the fuel in the main supply tank will force the fuel into said vacuum tank, through the passageways provided. As the vacuum tank fills the float therein will be lifted until the springs 49 pass centers and these springs will then operate to quickly close the valve 35 and open the valve 38 to connect the vacuum tank with the free atmosphere. The fuel will now flow by gravity through the valve 25 into the chamber 3 and pass on to the carbureter by gravity, as needed, being strained through the strainer 29, and the foreign matter falling down about the nipple 27 to be drained out.

As the fuel lowers in the vacuum tank the float therein will descend until the springs 49 again pass centers and the valve 35 will be quickly opened and the valve 38 closed and suction through the passageway 33 resumed. It is to be noted that the points of attachment of the springs 49 to the pins 48′, 48′ will move substantially vertically rather than in arcuate paths so that the tension on said springs, during the movements of the float in the vacuum tank, will be substantially uniform and consequently the resistance of said float to the rising fluid will also be substantially uniform thus conducting to a more precise and uniform operation of the valves.

Figures 1, 2:
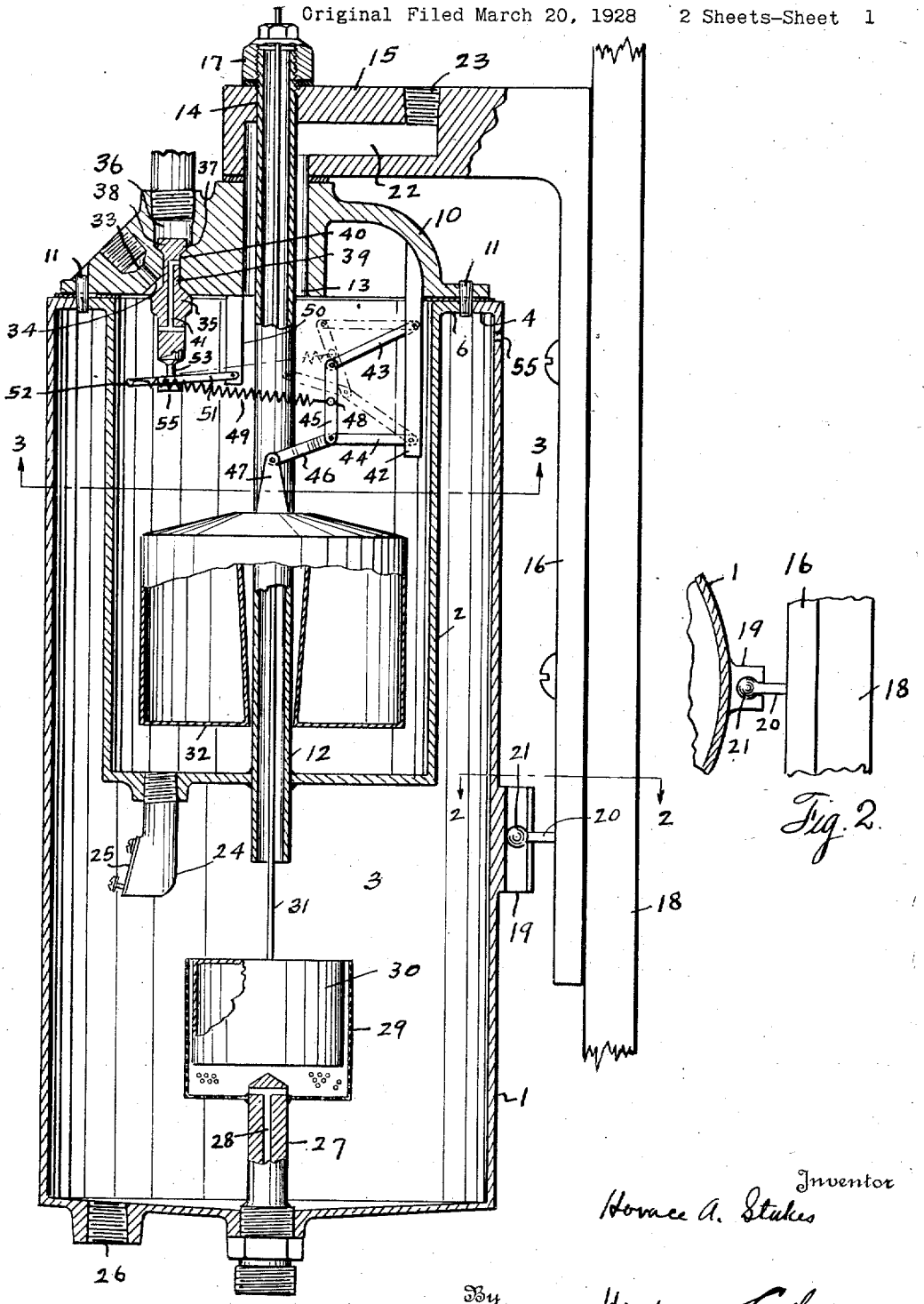
Figure 1 shows a vertical sectional view of the device.
Figure 2 shows a fragmentary cross sectional view taken on the line 2—2 of Figure 1.

In the form of valve actuating mechanism shown in Figure 6 since the float 32′ is connected directly to the link 45′ it will require less movement of said float to trip the valves than is the case with the construction shown in Figure 1 for actuating said valves, the valve actuating mechanism shown in Figure 6 thus providing a very sensitive valve control.

While the vacuum tank 2 is filling air must be admitted into the chamber 3 in order that the fluid in said chamber may be supplied uniformly to the carbureter. For the purpose the gauge rod is fitted loosely through the nut 17 and air may be supplied to said chamber for the purpose indicated through said nut 17 and tube 12. There is, also, an inlet air port 55 at the upper end of the tank 1 through which air may be admitted into the chamber 3 to facilitate the feeding of the fuel therefrom to the carbureter, and also through which the air may escape from said chamber as the fuel rises therein when it is delivered thereto from the vacuum tank, 3.

Special attention is called to the fact that the fuel feeding device described herein may be assembled, and maintained in assembled relation without the use of screws, or bolts, and is particularly characterized by few parts which may be easily and quickly assembled or dismembered, and whose parts are held in assembled relation by the same means provided for anchoring the device to its support.

While I have shown what I now consider the preferred forms of the invention, it is obvious that mechanical changes may be made therein and equivalents substituted for the parts shown and I hereby reserve the right to make such changes and substitutions as may be found desirable or practical and such as may be comprehended within the scope of the appended claims.

What I claim is:—

1. A fuel feeding device including an outer tank, an inner tank within and spaced from the outer tank forming a fuel chamber between them provided with an outlet, a common cover for said tanks having air passageways which communicate with the inner tank, a common valve mechanism through which said passageways may be opened and closed, a float in the inner tank, said valve mechanism including a yieldable member and means connecting the float to said yieldable member through which the valve mechanism may be actuated as the float moves up and down, said connecting means being characterized by the provision of an anchor to which the yieldable member is attached and a device connected to the anchor and effective to limit said anchor to movement in a straight line vertically.

2. A fuel feeding device including an outer tank, an inner tank within and spaced from the outer tank forming a fuel chamber between them, said inner tank having a valve controlled outlet into said chamber and said chamber having an outlet, a cover for said tanks, said cover having air passageways which communicate with the inner tank, valve means for controlling said passageways, mechanism for actuating said valve means which includes a yieldable member connected to said valve means and a movable anchor connected to said yieldable member, a float in the inner tank and means connected to said float through which said anchor may be moved up and down in substantially a straight line as said float moves, to effect the movement of said yieldable member and the consequent actuation of said valve means.

3. In a fuel feeding device an outer tank, an inner tank within and spaced from the outer tank, a common cover for said tank, means for detachably securing the upper ends of said tanks together, means carried by the cover for locking said tanks against separation, a support for said device, a common means attached to the inner tank through which said cover may be secured in assembled relation with said tanks and the entire assembly anchored to said support.

4. In a fuel feeding device an outer tank, an inner tank within and spaced from the outer tank, a common cover for said tanks, means for detachably securing the upper ends of said tanks together, means carried by the cover for locking said tanks against separation, a support for said device, means attached to the inner tank through which said cover may be secured in assembled relation with said tanks and the entire assembly anchored to said support, said support and cover having an inlet channel leading into the inner tank.

5. In a fuel feeding device an outer tank, an inner tank within and spaced from the outer tank, a support, a common cover for said tanks clamped between the support and the upper ends of the tanks, means attached to the inner tank and to said support and securing said cover in assembled relation with said tanks and anchoring said assembly to said support.

6. In a fuel feeding device an outer tank having an internal, annular flange at its upper end, an inner tank in said outer tank having an external annular flange at its upper end, said flanges being provided, one with J-slots and the other with tenons adapted to interlock in said slots, a support, and a common cover for said tanks clamped between said support and tanks.

7. In a fuel feeding device an outer tank having an internal, annular flange at its upper end, an inner tank in said outer tank having an external annular flange at its upper end, said flanges being provided, one with J-slots and the other with tenons adapted to interlock in said slots, and a common cover for said tanks, a support for the tanks, said support and cover having a fuel inlet channel into the inner tank, and also having an air inlet and an air outlet communicating with the interior of said inner tank, valve means controlling said air inlet and outlet, a float in the inner tank and operative connections between said float and valve means.

8. In a fuel feed device an outer tank, an inner tank within and spaced from said outer tank forming a chamber between them, a cover on said tanks, said chamber having an outlet, a screen surrounding the inner end of said outlet, a float within said screen, a gauge rod attached to said float and whose upper end extends through and above said cover.

9. In a fuel feed device an outer tank, an inner tank within and spaced from said outer tank forming a chamber between them, a cover on said tanks, said chamber having an outlet, a screen surrounding the inner end of said outlet, a float within said screen, a gauge rod attached to said float and whose upper end extends through and above said cover, said inner tank having an inlet leading into the same and also having an outlet leading into said chamber and means for controlling the flow of fluid into and out of said inner tank.

10. In a fuel feeding device having an outer tank, an inner tank, there being air passageways which communicate with the inner tank; valve means for controlling said passageways, a lever connected to said valve means and pivoted at one end, a yieldable member connected, at one end, to the other end of said lever, a vertically movable float in the inner tank, a vertically movable anchor to which said float and other end of said yieldable member are connected and means confining said anchor to a substantially straight line movement to maintain a substantially uniform tension on said yieldable member.

11. In a fuel feeding device having a feed tank, a vacuum tank arranged to deliver liquid into said feed tank and provided with an air inlet passageway and a suction air passageway, said passageways communicating with the interior of said vacuum tank; valve means for controlling said passageways, a lever connected to said valve means and fulcrumed at one end, a yieldable member connected, at one end, to the other end of said lever, a vertically movable anchor to which the other end of said yieldable member is connected, means for confining said anchor to a substantially straight line movement to maintain a substantially uniform tension on said yieldable member, and means for automatically controlling the movement of said anchor according to the amount of liquid in said vacuum tank.

12. In a fuel feeding device, having a feed tank, a vacuum tank arranged to deliver liquid into said feed tank and provided with an air inlet passageway and a suction air passageway, said passageways communicating with the interior of said vacuum tank; a lever fulcrumed at one end in said vacuum tank, a yieldable member connected, at one end, to the other end of said lever, a vertically movable anchor to which the other end of said yieldable member is connected, means for confining said anchor to a substantially straight line movement to maintain a substantially uniform tension on said yieldable member, valve means for controlling said passageways and connected to said lever intermediate the ends thereof and means for automatically controlling the movement of said anchor according to the amount of liquid in said vacuum tank.

13. In a fuel feeding device having a feed tank, a vacuum tank arranged to deliver liquid into said feed tank and provided with an air inlet passageway and a suction passageway; a lever fulcrumed at one end in the vacuum tank, a yieldable member connected at one end to the other end of said lever, means to which the other end of said yieldable member is connected and movable in an approximately straight line direction to automatically control the movement of said other end of said yieldable member according to the amount of liquid in said vacuum tank, a single valve means for controlling said passageways and connected to said lever inwardly from the free end thereof whereby the leverage, available for opening and closing the valve means, will be accentuated.

14. In a fuel feeding device having a feed tank, a vacuum tank arranged to deliver liquid into said feed tank and provided with an air inlet passageway and a suction passageway, said passageways communicating with the interior of said vacuum tank; a common valve means arranged to open outwardly to close one of said passageways and to open inwardly to close the other of said passageways and means for automatically controlling the movement of said valve means according to the amount of liquid in said vacuum tank, said valve controlling means including a yieldable valve actuating member and an anchor movable in an approximately straight line direction and to which one end of said actuating member is attached, said actuating member being arranged to exert a substantially uniform pressure against either of said valves when in either position.

15. In a fuel feeding device a feed tank, a vacuum tank arranged to deliver liquid into said feed tank, an outlet leading from said feed tank, a screen surrounding the inner end of said outlet, a float within said screen, a gauge rod attached to said float and whose upper end is exposed outside of said device.

16. In a fuel feeding device, a feed tank, a vacuum tank, associated therewith and arranged to deliver liquid into said feed tank, said feed tank having an outlet, a screen surrounding the inner of said outlet, a float within said screen, an upstanding gauge rod attached to the float and whose upper end is exposed, said vacuum tank having an inlet into the same and also having an outlet into said feed tank and means for controlling the flow of fluid into and out of said vacuum tank.

17. In a fuel feeding device a vacuum tank for receiving liquid fuel and having an air inlet passageway and an air outlet passageway, a float in said tank, a valve member movable into one position to close the inlet passageway and open the outlet passageway and movable into another position to open the inlet passageway and close the outlet passageway, and means including a pivoted lever connected to the valve member, a swinging anchor connected to the float and a pull spring connecting the free end of said lever and the anchor for automatically controlling the movement of said valve member according to the amount of liquid in said tank.

18. In a fuel feeding device a vacuum tank for receiving liquid fuel and having an air inlet passageway and an air outlet passageway, a valve member movable into one position to close the inlet passageway and open the outlet passageway and movable into another position to open the inlet passageway and close the outlet passageway, and means for automatically controlling the movement of said valve member according to the amount of liquid in said tank, said controlling means including a lever fulcrumed at one end, a yieldable member attached, at one end, to the other end of said lever, a float operatively connected with the other end of said yieldable member, said valve member being connected to said lever at a point intermediate said ends of said lever.

19. In a fuel feeding device a vacuum tank for receiving liquid fuel and having an air inlet passageway and a suction passageway, valve means for controlling said passageways, a lever connected to said valve means and fulcrumed, at one end, a yieldable member connected at one end to the other end of said lever, a vertical movable anchor to which the other end of said yieldable member is connected, means for confining said anchor to a substantially straight line movement to maintain a substantially uniform tension on said yieldable member and means for automatically controlling the movement of said anchor according to the amount of liquid in said vacuum tank.

In testimony whereof witness my signature, this 7th day of May, A. D. 1931.

HORACE A. STUKES.